US010892468B2

(12) United States Patent
Hong et al.

(10) Patent No.: US 10,892,468 B2
(45) Date of Patent: Jan. 12, 2021

(54) BATTERY MODULE WITH SHORT-CIRCUIT UNIT, AND BATTERY PACK AND VEHICLE INCLUDING THE SAME

(71) Applicant: LG CHEM, LTD., Seoul (KR)

(72) Inventors: Soon-Chang Hong, Daejeon (KR); Kye-Yeon Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 160 days.

(21) Appl. No.: 16/337,347

(22) PCT Filed: Jun. 11, 2018

(86) PCT No.: PCT/KR2018/006603
§ 371 (c)(1),
(2) Date: Mar. 27, 2019

(87) PCT Pub. No.: WO2019/004632
PCT Pub. Date: Jan. 3, 2019

(65) Prior Publication Data
US 2020/0035980 A1 Jan. 30, 2020

(30) Foreign Application Priority Data
Jun. 27, 2017 (KR) .......................... 10-2017-0081350

(51) Int. Cl.
H01M 2/34 (2006.01)
H01M 2/20 (2006.01)
(Continued)

(52) U.S. Cl.
CPC ............. H01M 2/345 (2013.01); B60L 50/64 (2019.02); B60L 58/15 (2019.02); H01M 2/206 (2013.01);
(Continued)

(58) Field of Classification Search
CPC .... H01M 2/345; H01M 2/34; H01M 2200/20; H01M 2/202; H01M 2/20; H01M 2/266; H01M 2/348; H01M 10/4235
See application file for complete search history.

(56) References Cited

U.S. PATENT DOCUMENTS 5,521,021 A 5/1996 Alexandres et al.
2006/0012334 A1* 1/2006 Watson ............... H01M 10/613
320/112

(Continued)

FOREIGN PATENT DOCUMENTS

EP 3512008 A1 7/2019
EP 3540822 A1 9/2019
(Continued)

OTHER PUBLICATIONS

International Search Report for PCT/KR2018/006603 (PCT/ISA/210) dated Oct. 2, 2018.

Primary Examiner — Imran Akram
(74) Attorney, Agent, or Firm — Birch, Stewart, Kolasch & Birch, LLP

(57) ABSTRACT

A battery module, which includes: a first bus bar electrically connected to a first electrode lead of a first battery cell; a second bus bar electrically connected to a second electrode lead of a second battery cell; a short-circuit unit configured to move toward the first bus bar and the second bus bar by receiving an expansive force due to a volume increase of the first battery cell and another battery cell adjacent to the first battery cell so that the first bus bar and the second bus bar are electrically connected to generate a short circuit; and a cartridge configured to accommodate or support at least a portion of the first electrode lead, the second electrode lead, the first bus bar, the second bus bar and the short-circuit unit.

13 Claims, 10 Drawing Sheets

(51) Int. Cl.
  *H01M 2/26*   (2006.01)
  *B60L 58/15*   (2019.01)
  *B60L 50/64*   (2019.01)

(52) U.S. Cl.
  CPC .......... *H01M 2/26* (2013.01); *H01M 2200/20* (2013.01); *H01M 2220/20* (2013.01)

(56) References Cited

U.S. PATENT DOCUMENTS

| | | | |
|---|---|---|---|
| 2009/0096558 A1* | 4/2009 | Lange | H01H 51/2209 335/131 |
| 2010/0227205 A1* | 9/2010 | Byun | H01M 2/0237 429/61 |
| 2013/0153541 A1* | 6/2013 | Monahan | H02B 13/025 218/155 |
| 2013/0323549 A1* | 12/2013 | Choi | H01M 2/30 429/62 |
| 2014/0065467 A1* | 3/2014 | Choi | H01M 2/204 429/158 |
| 2014/0127549 A1 | 5/2014 | Roh et al. | |
| 2014/0186664 A1 | 7/2014 | Park | |
| 2014/0186667 A1 | 7/2014 | Lee et al. | |
| 2016/0233650 A1* | 8/2016 | Baillargeon | H02B 3/00 |
| 2016/0307710 A1* | 10/2016 | Bruchschmidt | H01H 13/52 |
| 2016/0379790 A1* | 12/2016 | Boehme | H02H 7/12 335/12 |

FOREIGN PATENT DOCUMENTS

| | | |
|---|---|---|
| EP | 3540823 A1 | 9/2019 |
| JP | 2002-124236 A | 4/2002 |
| JP | 2015-2113 A | 1/2015 |
| JP | 2015-53145 A | 3/2015 |
| KR | 10-1046192 B1 | 7/2011 |
| KR | 10-2013-0043258 A | 4/2013 |
| KR | 10-2014-0028943 A | 3/2014 |
| KR | 10-1449307 B1 | 10/2014 |
| KR | 10-2016-0026469 A | 3/2016 |
| KR | 10-2016-0050543 A | 5/2016 |
| KR | 10-2017-0016065 A | 2/2017 |
| WO | WO 2009/057893 A1 | 5/2009 |
| WO | WO 2013/015524 A1 | 1/2013 |
| WO | WO 2017/098838 A1 | 6/2017 |

* cited by examiner

000
BATTERY MODULE WITH SHORT-CIRCUIT UNIT, AND BATTERY PACK AND VEHICLE INCLUDING THE SAME

TECHNICAL FIELD

The present disclosure relates to a battery module, and a battery pack and a vehicle including the same, and more particularly, to a battery module having improved stability by preventing overcharge of the battery module, and a battery pack and a vehicle including the same.

The present application claims priority to Korean Patent Application No. 10-2017-0081350 filed on Jun. 27, 2017 in the Republic of Korea, the disclosures of which are incorporated herein by reference.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries commercially available at the present include nickel-cadmium batteries, nickel hydrogen batteries, nickel-zinc batteries, lithium secondary batteries and the like. Among them, the lithium secondary batteries are in the limelight since they have almost no memory effect compared to nickel-based secondary batteries and also have very low self-discharging rate and high energy density.

The lithium secondary battery mainly uses lithium-based oxide and carbonaceous material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior, namely a battery case, in which the electrode assembly is accommodated and sealed together with an electrolyte.

Generally, a lithium secondary battery may be classified into a can-type secondary battery in which an electrode assembly is included in a metal can and a pouch-type secondary battery in which an electrode assembly is included in a pouch made of aluminum laminate sheets, depending on the shape of an exterior.

In recent years, secondary batteries have been widely used not only in small-sized devices such as portable electronic devices but also in medium-sized and large-sized devices such as vehicles and power storage devices. In particular, as carbon energy is getting depleted and the interest in the environment is increasing, the attention is focused on hybrid electric vehicles and electric vehicles around the world including the US, Europe, Japan and Korea. The most important component of the hybrid electric vehicles and electric vehicles is a battery pack that gives a drive power to a vehicle motor. Since the hybrid electric vehicle or electric vehicle is able to obtain a driving force of the vehicle through charging and discharging of the battery pack, the fuel efficiency is higher than that of a vehicle using only an engine, and pollutants may be reduced or substantially eliminated. For these reasons, the hybrid electric vehicles and electric vehicles are used more and more. In addition, the battery pack of the hybrid electric vehicle or electric vehicle includes a plurality of secondary batteries, and the plurality of secondary batteries are connected in series and in parallel to improve capacity and power.

The secondary battery has excellent electrical characteristics, but in the abnormal operating conditions such as overcharge, overdischarge, exposure to high temperature and electrical short circuit, the decomposition reaction of an active material, an electrolyte and the like of the battery is caused to generate heat and gas, thereby resulting in a so-called swelling phenomenon where the secondary battery swells. The swelling phenomenon accelerates the decomposition reaction, which may cause explosion and ignition of the secondary battery due to thermal runaway.

Thus, the secondary battery includes a safety system such as a protection circuit for cutting a current at overcharge, overdischarge or overcurrent, a positive temperature coefficient (PTC) element for cutting a current by greatly increasing resistance when temperature rises, a safety vent for cutting a current or venting a gas when pressure increases due to gas generation.

In particular, in the conventional art, in order to ensure the safety of the battery pack even if a swelling phenomenon occurs, an electrical connecting member that is cut off by a physical change when the volume of secondary batteries expands has been studied.

However, even if the electrical connecting member is used, it is difficult to surely cut the current of the secondary battery when the secondary batteries are expanded over a certain volume.

In addition, the secondary battery repeats expansion and contraction even when it is in a normal operating state, not in an abnormal operating state, and thus the current of the secondary battery may be cut even in a normal operation range, which may deteriorate the operation reliability.

DISCLOSURE

Technical Problem

The present disclosure is directed to providing a battery module, which may prevent overcharge by fracturing a fracturing portion formed at a first bus bar since a short-circuit unit moves toward a first bus bar and a second bus bar and comes into contact thereto by receiving an expansive force due to the volume increase of a first battery cell and another battery cell adjacent to the first battery cell to electrically connect the first bus bar and the second bus bar and thus cause a short circuit, and to providing a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a first bus bar electrically connected to a first electrode lead of a first battery cell; a second bus bar electrically connected to a second electrode lead of a second battery cell; a short-circuit unit configured to move toward the first bus bar and the second bus bar by receiving an expansive force due to a volume increase of the first battery cell and an other battery cell adjacent to the first battery cell so that the first bus bar and the second bus bar are electrically connected to generate a short circuit; and a cartridge configured to accommodate or support at least a portion of the first electrode lead, the second electrode lead, the first bus bar, the second bus bar and the short-circuit unit.

Preferably, the short-circuit unit may include: a slide bar having a contact portion provided at the other end thereof and in contact with a first of the first battery cell to receive the expansive force, and a placing portion provided at a second thereof so that a short-circuit terminal is placed thereon; and a buffering member having a first end and a second end that are respectively in contact with the contact portion and the cartridge, so as to be compressed by the slide bar to absorb an impact when the slide bar moves toward the first bus bar and the second bus bar.

Preferably, when the volume of the first battery cell and the other battery cell adjacent to the first battery cell increases, the slide bar may receive the expansive force through the contact portion to move toward the first bus bar and the second bus bar.

Preferably, the short-circuit terminal may be in contact with the first bus bar and the second bus bar and electrically connect the first bus bar and the second bus bar to generate a short circuit.

Preferably, the short-circuit terminal may be made of a conductive material.

Preferably, the first bus bar may include: a first connection plate contacted and electrically connected to the first electrode lead; a first power plate formed to from the first connection plate in a direction away from the first battery cell and be electrically connected to an external power source; and a first protruding plate formed to protrude toward the second bus bar from the first power plate.

Preferably, the second bus bar may include: a second connection plate contacted and electrically connected to the second electrode lead; a second power plate formed to extend from the second connection plate in a direction away from the second battery cell and be electrically connected to the external power source; and a second protruding plate formed to protrude toward the first bus bar from the second power plate.

Preferably, at least one of the first bus bar and the second bus bar may further include a fracturing portion that is fractured to cut an electric connection to the outside when the short circuit is generated.

Preferably, the fracturing portion may be formed to have a cross section smaller than an average cross section of the first bus bar or the second bus bar.

Preferably, the fracturing portion may be formed in at least one of the first power plate of the first bus bar and the second power plate of the second bus bar.

Preferably, the cartridge may have an accommodation portion formed therein with a shape corresponding to a shape of the short-circuit unit to accommodate the short-circuit unit therein.

Preferably, the cartridge may support at least a portion of each of the first electrode lead and the first bus bar that are in surface contact with each other to be electrically connected, and support at least a portion of each of the second electrode lead and the second bus bar that are in surface contact with each other to be electrically connected.

A battery pack according to the present disclosure may include the battery module.

A vehicle according to the present disclosure may include the battery module.

Advantageous Effects

According to the present disclosure, a first bus bar and a second bus bar are electrically connected by means of an expansive force due to the volume increase of a first battery cell and another battery cell adjacent to the first battery cell to cause a short circuit, and thus a fracturing portion formed at any one of the first bus bar and the second bus bar is fractured to prevent overcharge of the battery module, thereby improving the stability of the battery module.

BEST MODE

Figure 1:
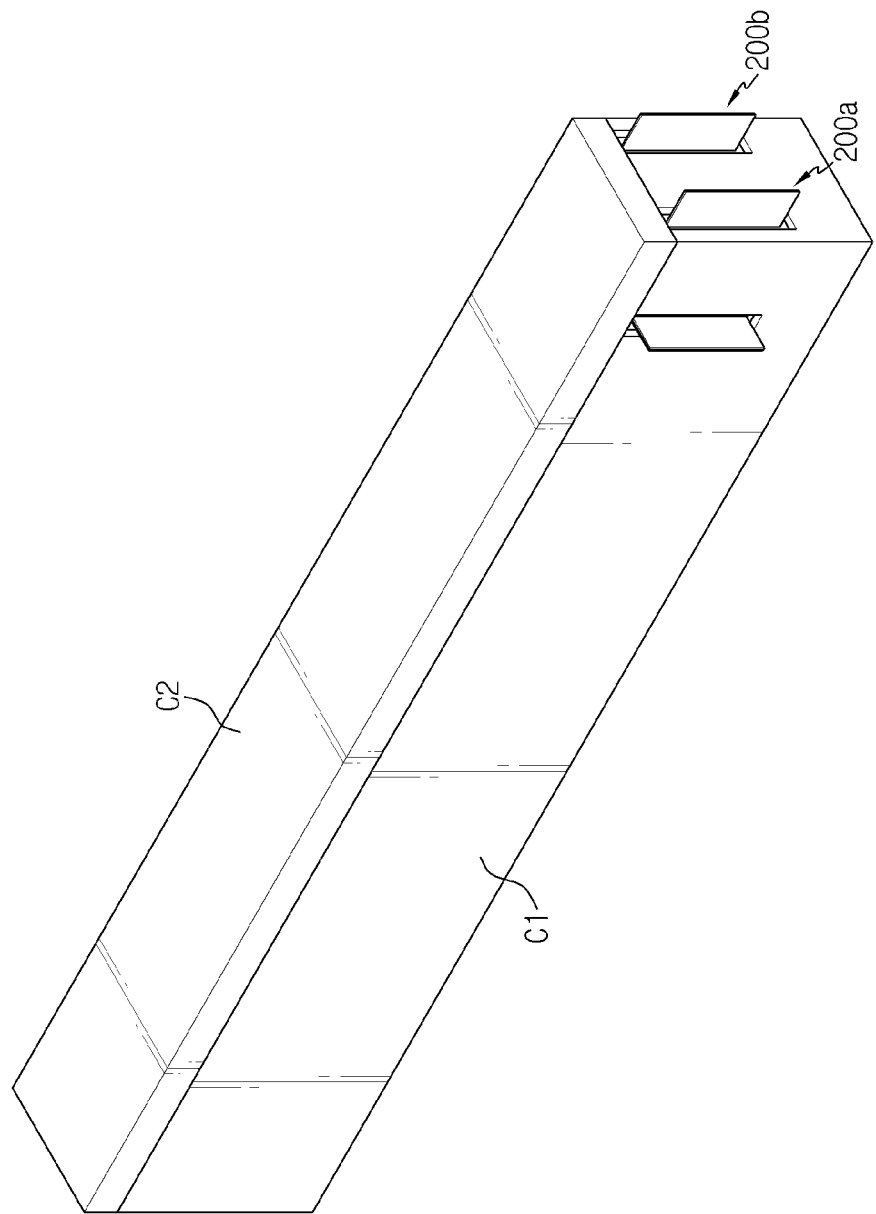
FIG. 1 is a perspective view showing a battery module according to an embodiment of the present disclosure.

The above objects, features and advantages will be described in detail below with reference to the accompanying drawings, so that those skilled in the art to which the present disclosure belongs can easily implement the technical idea of the present disclosure. In the explanations of the present disclosure, if it is deemed that any specific explanation of the related technology can unnecessarily obscure the gist of the present disclosure, the detailed explanation may be omitted. Hereinafter, a preferred embodiment according to the present disclosure will be described in detail with reference to the accompanying drawings. In the drawings, the same reference numerals are used to indicate the same or similar components.

Figure 2:
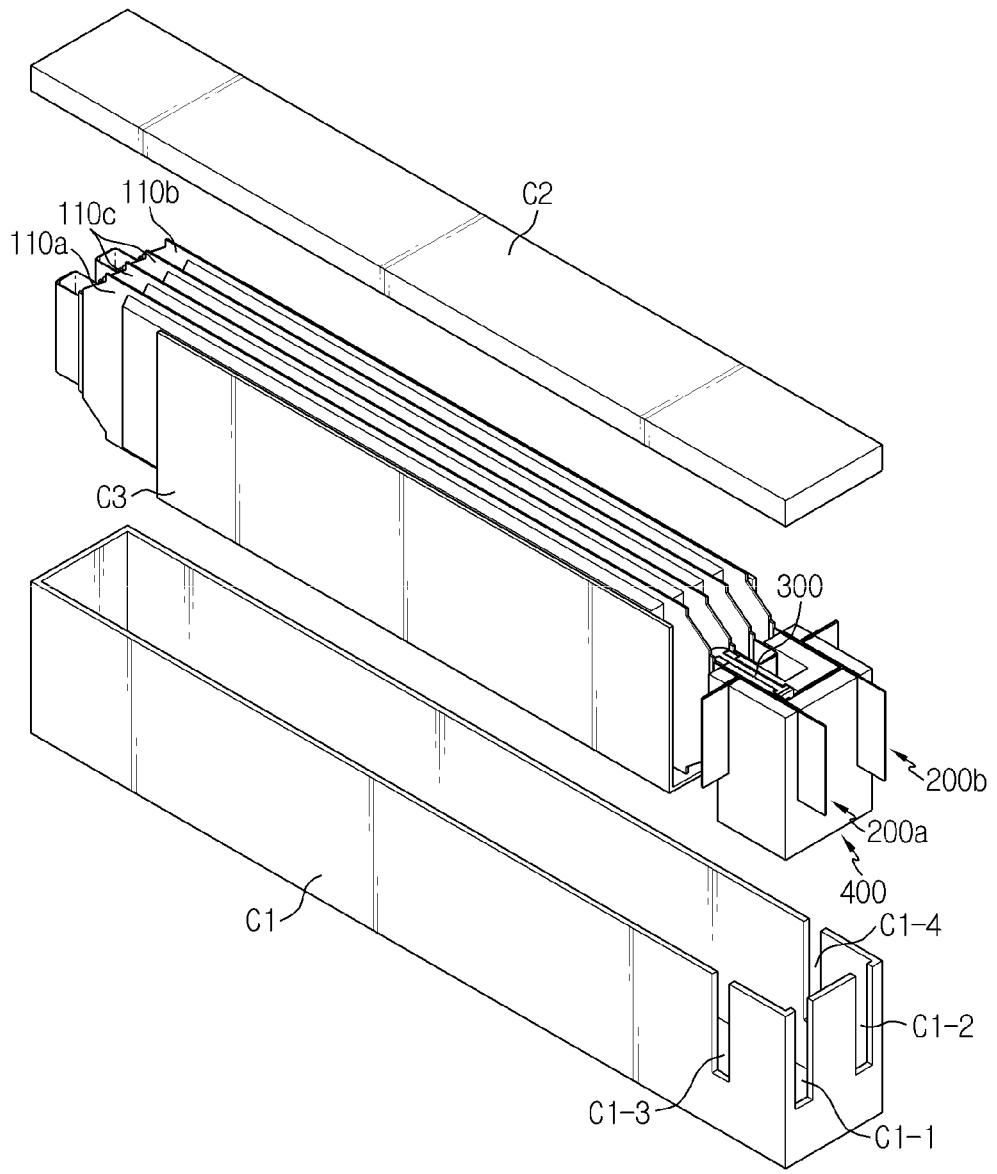
FIG. 2 is an exploded perspective view showing a battery module according to an embodiment of the present disclosure.
Figure 3:
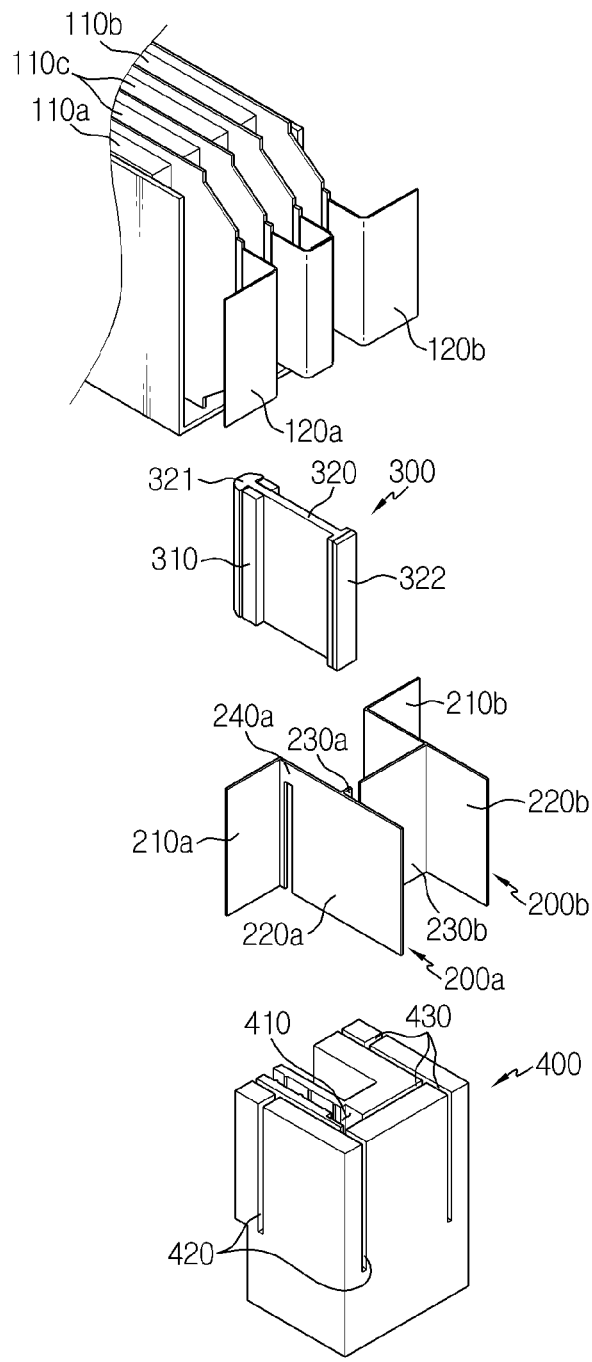
FIG. 3 is an enlarged exploded perspective view showing the battery module according to an embodiment of the present disclosure.
Figure 4:
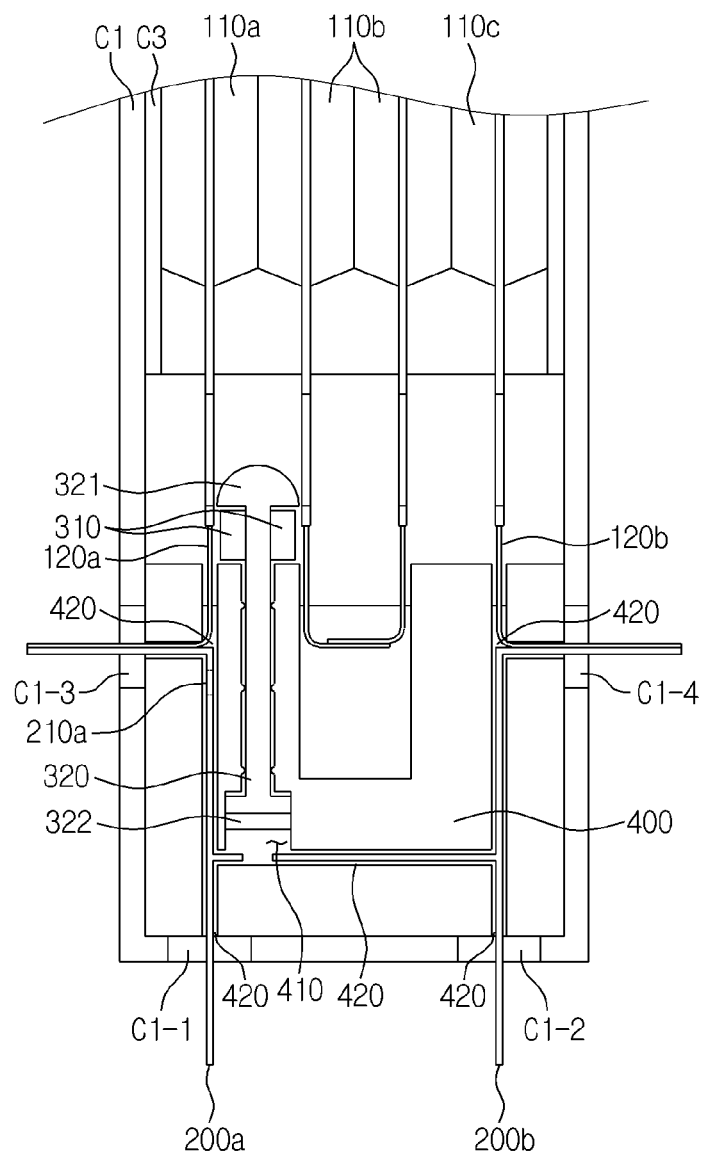
FIG. 4 is a diagram showing a top surface of the battery module according to an embodiment of the present disclosure, before volume increase occurs.

FIG. 1 is a perspective view showing a battery module according to an embodiment of the present disclosure, FIG. 2 is an exploded perspective view showing a battery module according to an embodiment of the present disclosure, from which only a module case is dissembled, FIG. 3 is an enlarged exploded perspective view showing the battery module according to an embodiment of the present disclosure, from which a first bus bar, a second bus bar and a short-circuit unit are dissembled, and FIG. 4 is a diagram showing a top surface of the battery module according to an embodiment of the present disclosure, before volume increase occurs.

Referring to FIGS. 1 to 4, a battery module according to an embodiment of the present disclosure may include a module case C1, C2, C3, a battery cell 110a, 110b, 110c, a bus bar 200a, 200b, a short-circuit unit 300 and a cartridge 400.

The module case C1, C2, C3 may accommodate components of the battery module according to the present disclosure therein and protect the battery module against impacts applied from the outside.

More specifically, the module case C1, C2, C3 may include a housing C1 for accommodating the battery cell 110a, 110b, 110c, the bus bar 200a, 200b and the short-circuit unit 300 in an inner space thereof, a cover C2 for covering an upper portion of the housing C1, and a clamp C3 for supporting the battery cell 110a, 110b, 110c in a right and left direction at the inside of the housing C1.

The housing C1 and the cover C2 of the module case C1, C2, C3 may be sealed by welding.

Meanwhile, the housing C1 may include a bus bar hole C1-1, C1-2 formed in a front surface thereof so that the bus bar 200a, 200b accommodated in the inner space protrudes out toward the front. By doing so, the bus bar 200a, 200b connected to the electrode lead of the battery cell 110a, 110b, 110c protrudes and exposes out of the module case C1, C2, C3, so that an external power source may be electrically connected to the bus bar 200a, 200b exposed out of the module case C1, C2, C3 to charge or discharge the battery cell 110a, 110b, 110c.

In addition, the housing C1 may have support holes C1-3, C1-4 formed at right and left sides thereof so that the electrode lead of the battery cell 110a, 110b, 110c and the bus bar 200a, 200b contacted to face each other in the inner space may protrude out toward the right and left directions. By doing so, the electrode lead of the battery cell 110a, 110b, 110c and the bus bar 200a, 200b contacted to face each other may be exposed to the outside, and may be supported inside the support holes C1-3, C1-4 to stably maintain their contact state even though being spaced apart from the ground.

Meanwhile, the clamp C3 may support the battery cell 110a, 110b, 110c in the right and left direction while surrounding the right and left sides and the bottom of the battery cell 110a, 110b, 110c. By doing so, when the volume of the battery cell 110a, 110b, 110c increases due to overcharge, the clamp C3 may apply a pressure to the right and left sides of the battery cell 110a, 110b, 110c to control swelling so that the volume increases in the front and rear direction.

In other words, the clamp C3 may guide the volume of the battery cell 110a, 110b, 110c to be increased by overcharge in the front and rear direction where the electrode lead is formed. Accordingly, when the volume of the battery cell 110a, 110b, 110c according to the present disclosure increases due to overcharge, the front and rear surfaces of the battery cell 110a, 110b, 110c where the electrode lead is formed may be expanded.

The module case C1, C2, C3 according to the present disclosure is not specially limited as long as the components of the battery module are accommodated in the inner space and protected thereby as described above, and various kinds of cases may be used for the battery module of the present disclosure.

The battery cell 110a, 110b, 110c may be provided in plural, and the battery cells 110a, 110b, 110c may be stacked side by side in the right and left direction.

The kind of the battery cell 110a, 110b, 110c is not specially limited, and various kinds of secondary batteries may be used for the battery module according to the present disclosure. For example, the battery cell 110a, 110b, 110c may be a lithium ion battery, a lithium polymer battery, a nickel cadmium battery, a nickel hydride battery, a nickel zinc battery, or the like. In particular, the battery cell 110a, 110b, 110c may be a lithium secondary battery.

Meanwhile, the battery cell 110a, 110b, 110c may be classified into a pouch type, a cylindrical type, a rectangular type and the like, depending on its exterior. In particular, the battery cell 110a, 110b, 110c of the battery module according to the present disclosure may be a pouch-type secondary battery.

If the battery cell 110a, 110b, 110c is implemented using a pouch-type secondary battery, as shown in FIG. 2, each battery cell 110a, 110b, 110c has broad surfaces at right and left sides thereof, and the broad surfaces of the battery cells 110a, 110b, 110c may be provided to face to each other. In addition, in this case, each battery cell 110a, 110b, 110c may include an electrode lead 120a, 120b that protrudes toward the front or is bent while protruding toward the front.

The electrode lead 120a, 120b may include a positive electrode lead and a negative electrode lead. The positive electrode lead may be connected to a positive electrode plate of an electrode assembly, and the negative electrode lead may be connected to a negative electrode plate of the electrode assembly.

Meanwhile, the battery module according to the present disclosure may include a first battery cell 110a located at a leftmost side, a second battery cell 110b located at a rightmost side, and a plurality of third battery cells 110c located between the first battery cell 110a and the second battery cell 110b. At this time, the electrode leads of the first battery cell 110a and the second battery cell 110b may be disposed so that the electrode leads 120a, 120b having the same polarity are oriented in the same direction. In addition, the electrode leads of the first battery cell 110a and the second battery cell 110b may be formed to protrude toward the left and right directions.

More specifically, as shown in FIG. 3, the first battery cell 110a may be disposed so that the first electrode lead 120a having a positive polarity is oriented to the right direction, and the second battery cell 110b may be disposed so that the second electrode lead 120b having a negative polarity is oriented to the left direction.

Meanwhile, the first electrode lead 120a of the first battery cell 110a may be physically contacted and electrically connected to the first bus bar 200a, explained later. By doing so, the first electrode lead 120a may be electrically connected to a positive electrode of the external power source through the first bus bar 200a.

The second electrode lead 120b of the second battery cell 110b may be physically contacted and electrically connected to the second bus bar 200b, explained later. By doing so, the second electrode lead 120b may be electrically connected to a negative electrode of the external power source through the second bus bar 200b.

Here, the first bus bar 200a may be a bus bar that is electrically connected to the first electrode lead 120a of the first battery cell 110a, among the bus bars 200a, 200b according to the present disclosure, and the second bus bar 200b may be a bus bar that is electrically connected to the second electrode lead 120b of the second battery cell 110b, among the bus bars 200a, 200b according to the present disclosure.

Hereinafter, the connection structure between the first electrode lead 120a of the first battery cell 110a and the first bus bar 200a and the connection structure between the second electrode lead 120b of the second battery cell 110b and the second bus bar 200b according to the present disclosure will be described in detail.

Figure 5:
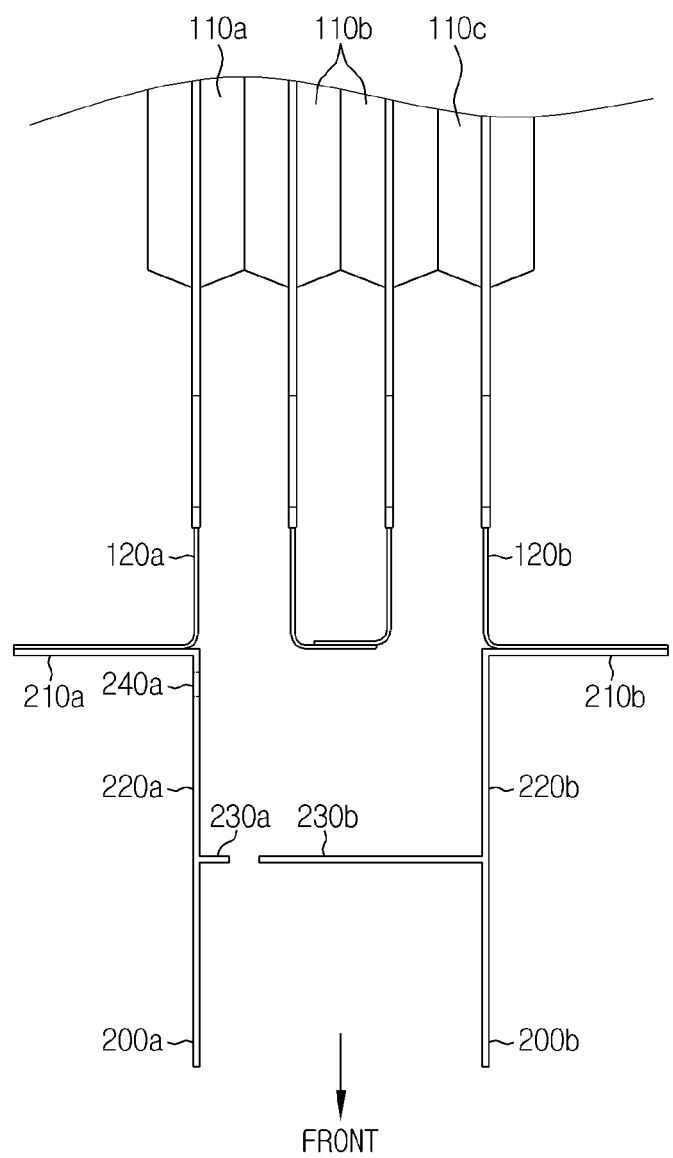
FIG. 5 is a diagram showing only a first battery cell, a second battery cell, a third battery cell, a first bus bar and a second bus bar of the battery module according to an embodiment of the present disclosure.

FIG. 5 is a diagram showing only a first battery cell, a second battery cell, a third battery cell, a first bus bar and a second bus bar of the battery module according to an embodiment of the present disclosure.

Referring to FIG. 5 further, the first electrode lead 120a of the first battery cell 110a may protrude toward the front from the first battery cell 110a and be bent about perpendicular toward the outside of the battery module to be in surface contact with the first bus bar 200a.

More specifically, the first bus bar 200a may include a first connection plate 210a, a first power plate 220a and a first protruding plate 230a.

The first connection plate 210a has a plate shape and may be in surface contact with the first electrode lead 120a and be electrically connected thereto.

At this time, the first connection plate 210a may extend in the same direction as the protruding direction of the first electrode lead 120a. In other words, the first connection plate 210a may be formed to extend in the same direction as the bending direction of the first electrode lead 120a that extends toward the front direction of the first battery cell 110a and is bent perpendicularly.

Meanwhile, the first connection plate 210a may be physically contacted to the first electrode lead 120a by welding so as to be electrically connected thereto.

At this time, in a state where the first electrode lead 120a of the first battery cell 110a and the first bus bar 200a are in surface contact and thus electrically connected to each other, a portion of the first connection plate 210a may be inserted into a support groove 420 (FIG. 3) of a cartridge 400 (FIG. 3), explained later, and be supported thereby.

In addition, in a state where the first electrode lead 120a of the first battery cell 110a and the first bus bar 200a are in surface contact and thus electrically connected to each other, a portion of the first connection plate 210a may be exposed outwards through a support hole C1-3 (FIG. 2) of a housing C1 (FIG. 2).

The first power plate 220a has the other end connected to one end of the first connection plate 210a, and may be formed to extend toward the front of the first battery cell 110a from one end of the first connection plate 210a. In other words, the other end of the first power plate 220a may perpendicular contact one end of the first connection plate 210a, and one end of the first power plate 220a may extend toward the front of the first battery cell 110a.

In addition, one end of the first power plate 220a may be electrically connected to the positive electrode of the external power source.

At this time, a portion of the first power plate 220a may be inserted into the support groove 420 (FIG. 3) of the cartridge 400 (FIG. 3), explained later, and be supported thereby, and the other portion may be exposed out through the bus bar hole C1-1 (FIG. 2) of the housing C1 (FIG. 2).

The first protruding plate 230a may protrude toward the second bus bar 200b from the first power plate 220a.

More specifically, the first protruding plate 230a may be formed to protrude approximately perpendicular to the first power plate 220a from the inner side of the first power plate 220a.

In addition, a portion of the first protruding plate 230a may be inserted into the support groove 420 (FIG. 3) of the cartridge 400 (FIG. 3), explained later, and be supported thereby.

Meanwhile, the first bus bar 200a may further include a fracturing portion 240a.

As shown in FIG. 3, the fracturing portion 240a may be formed at the first power plate 220a. More specifically, the fracturing portion 240a may be formed at a location of the first power plate 220a that is closer to the first battery cell 110a rather than the first protruding plate 230a.

Meanwhile, the fracturing portion 240a may be formed to have a cross section smaller than a cross section of the first connection plate 210a, the first power plate 220a and the first protruding plate 230a. In other words, the fracturing portion 240a formed at the first bus bar 200a may have a cross section smaller than an average cross section of the first bus bar 200a.

Since the fracturing portion 240a is formed to have a cross section smaller than a cross section of the first connection plate 210a, the first power plate 220a and the first protruding plate 230a, resistance may be increased when a current flows.

Accordingly, if the first bus bar 200a and the second bus bar 200b are electrically connected to form a short circuit among the first bus bar 200a, the second bus bar 200b and the external power source, the fracturing portion 240a may be fractured since overcurrent flows at the first bus bar 200a to generate high-temperature resistance heat.

The second electrode lead 120b of the second battery cell 110b protrudes toward the front from the second battery cell 110b and is bent at about a right angle in an outer direction of the battery module, namely in a direction opposite to the bending direction of the first electrode lead 120a of the first battery cell 110a, to make surface contact with the second bus bar 200b.

More specifically, the second bus bar 200b may include a second connection plate 210b, a second power plate 220b and a second protruding plate 230b.

The second connection plate 210b has a plate shape and may be in surface contact with the second electrode lead 120b and electrically connected thereto.

At this time, the second connection plate 210b may extend in the same direction as the protruding direction of the second electrode lead 120b. In other words, the second connection plate 210b may be formed to extend in the same direction as the bending direction of the second electrode lead 120b that extends toward the front of the second battery cell 110b and then is bent perpendicularly.

Meanwhile, the second connection plate 210b may be physically contacted to the second electrode lead 120b by welding and electrically connected thereto.

At this time, in a state where the second electrode lead 120b of the second battery cell 110b and the second bus bar 200b are in surface contact and thus electrically connected to each other, a portion of the second connection plate 210b may be inserted into the support groove 420 (FIG. 3) of the cartridge 400 (FIG. 3), explained later, and be supported thereby.

In addition, in a state where the second electrode lead 120b of the second battery cell 110b and the second bus bar 200b are in surface contact and thus electrically connected to each other, the second connection plate 210*b* may be exposed through a support hole C1-4 (FIG. 2) of the housing C1 (FIG. 2).

The second power plate 220*b* has the other end connected to one end of the second connection plate 210*b*, and may extend toward the front of the second battery cell 110*b* from one end of the second connection plate 210*b*. In other words, the other end of the second power plate 220*b* may perpendicularly contact one end of the second connection plate 210*b*, and one end of the second power plate 220*b* may extend toward the front of the second battery cell 110*b*.

In addition, one end of the second power plate 220*b* may be electrically connected to the negative electrode of the external power source.

At this time, a portion of the second power plate 220*b* may be inserted into the support groove 420 (FIG. 3) of the cartridge 400 (FIG. 3), explained later, and be supported thereby, and the other portion may be exposed out through the bus bar hole C1-2 (FIG. 2) of the housing C1 (FIG. 2).

The second protruding plate 230*b* may be formed to protrude toward the first bus bar 200*a* from the second power plate 220*b*.

More specifically, the second protruding plate 230*b* may be formed to protrude approximately perpendicular to the second power plate 220*b* from the inner side of the second power plate 220*b*.

In addition, a portion of the second protruding plate 230*b* may be inserted into the support groove 420 (FIG. 3) of the cartridge 400 (FIG. 3), explained later, and be supported thereby.

Figure 6:
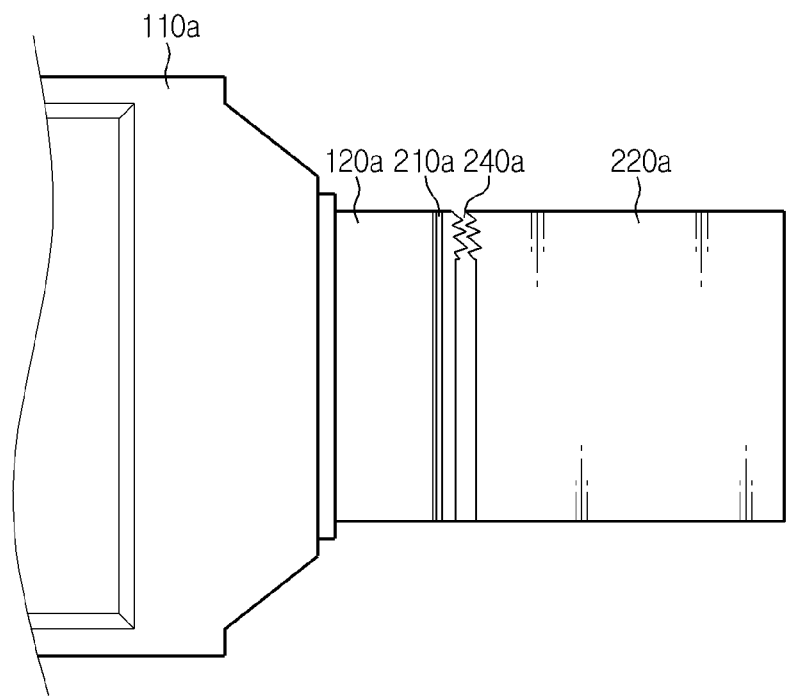
FIG. 6 is a diagram showing a side of the battery module according to an embodiment of the present disclosure after a fracturing portion is fractured.

FIG. 6 is a diagram showing a side of the battery module according to an embodiment of the present disclosure after a fracturing portion is fractured.

Referring to FIG. 6 further, in the battery module according to the present disclosure, if the first bus bar 200*a* and the second bus bar 200*b* are electrically connected to generate a short circuit, as shown in FIG. 6, the fracturing portion 240*a* of the first bus bar 200*a* that electrically connect the first electrode lead 120*a* of the first battery cell 110*a* and the external power source may be fractured to stop charging.

In other words, if the first bus bar 200*a* and the second bus bar 200*b* are electrically connected to generate a short circuit, the fracturing portion 240*a* connecting the first connection plate 210*a* connected to the first electrode lead 120*a* of the first battery cell 110*a* and the first power plate 220*a* connected to the external power source may be fractured to stop charging.

Here, the first bus bar 200*a* and the second bus bar 200*b* may be electrically connected when the short-circuit unit 300, explained later, moves toward the first bus bar 200*a* and the second bus bar 200*b* so that a short-circuit terminal 322 provided at the short-circuit unit 300 simultaneously contacts the first bus bar 200*a* and the second bus bar 200*b* to be electrically connected. In addition, the short-circuit unit 300 may move toward the first bus bar 200*a* and the second bus bar 200*b* by receiving an expansive force that is generated by a volume increase of the first battery cell 110*a* due to overcharge. At this time, if a volume of another battery cell 110*c* adjacent to the first battery cell 110*a* increases, the short-circuit unit 300 may receive an expansive force from another battery cell 110*c* adjacent to the first battery cell 110*a*.

Hereinafter, only the case where the volume of the first battery cell 110*a* increases will be described. However, it should be noted that an expansive force can be applied to the short-circuit unit 300 not only when the volume of the first battery cell 110*a* increases but also when the volume of another battery cell 110*c* adjacent to the first battery cell 110*a* increases.

The battery module according to the present disclosure may apply the expansive force generated by a volume increase due to overcharge of the first battery module 110*a* to the short-circuit unit 300 (FIG. 3) to electrically connect the first bus bar 200*a* and the second bus bar 200*b* (FIG. 3). Subsequently, as the fracturing portion 240*a* of the first bus bar 200*a* is fractured due to the short circuit of high current flowing at the first bus bar 200*a* and the second bus bar 200*b* (FIG. 3), the battery module according to the present disclosure may stop charging to prevent the overcharge of the battery module from progressing.

Meanwhile, even though it is illustrated that the fracturing portion 240*a* of the battery module according to an embodiment of the present disclosure is formed at the first bus bar 200*a*, a fracturing portion according to another embodiment of the present disclosure may be formed at the second bus bar, and a fracturing portion according to still another embodiment of the present disclosure may be formed at both the first bus bar and the second bus bar.

In addition, the fracturing portion 240*a* may be formed to have a narrower width than the adjacent region as described above. However, without being limited thereto, the fracturing portion 240*a* may be made of a metal having a melting point lower than that of the adjacent region, and the fracturing portion 240*a* may adopt any configuration as long as it is able to function as a fuse.

Hereinafter, the short-circuit unit 300 will be described in detail.

The short-circuit unit 300 may cause a short circuit by receiving an expansive force due to a volume increase of the first battery cell 110*a* to move toward the first bus bar 200*a* and the second bus bar 200*b* and contact the first bus bar 200*a* and the second bus bar 200*b*.

To this end, the short-circuit unit 300 may include a slide bar 320 and a buffering member 310.

The slide bar 320 may move toward the first bus bar 200*a* and the second bus bar 200*b* by contacting the first battery cell 110*a* at the other end thereof and receiving the expansive force. To this end, the slide bar 320 may have a semicylindrical contact portion 321 at the other end thereof. The surface of the contact portion 321 in contact with the first battery cell 110*a* may be a curved surface in order to constantly receive an expansive force generated in the plurality of directions from the first battery cell 110*a*.

Meanwhile, the slide bar 320 may include a placing portion provided at one end thereof so that the short-circuit terminal 322 contacting the first bus bar 200*a* and the second bus bar 200*b* is placed.

The placing portion has a plate shape to make surface contact with the short-circuit terminal 322 having a plate shape, so that the placing portion may stably support the short-circuit terminal 322 when the short-circuit terminal 322 contacts the first bus bar 200*a* and the second bus bar 200*b*.

One end and the other end of the buffering member 310 are respectively in contact with the contact portion 321 and the cartridge 400 so that the buffering member 310 is compressed by the slide bar 320 to absorb an impact when the slide bar 320 moves toward the first bus bar 200*a* and the second bus bar 200*b*.

In addition, the buffering member 310 is disposed between the contact portion 321 and the cartridge 400 to prevent the short-circuit unit 300 from moving toward the first bus bar 200*a* and the second bus bar 200*b*. Thus, if the expansive force due to the volume increase of the first bus bar 200a is not applied since no overcharge occurs in the battery module, it is possible to prevent an unnecessary short circuit from occurring at the first bus bar 200a and the second bus bar 200b.

The buffering member 310 may be formed with a sponge structure or a spring structure, and the buffering member 310 is not limited as long as it is able to absorb an impact.

Figure 7:
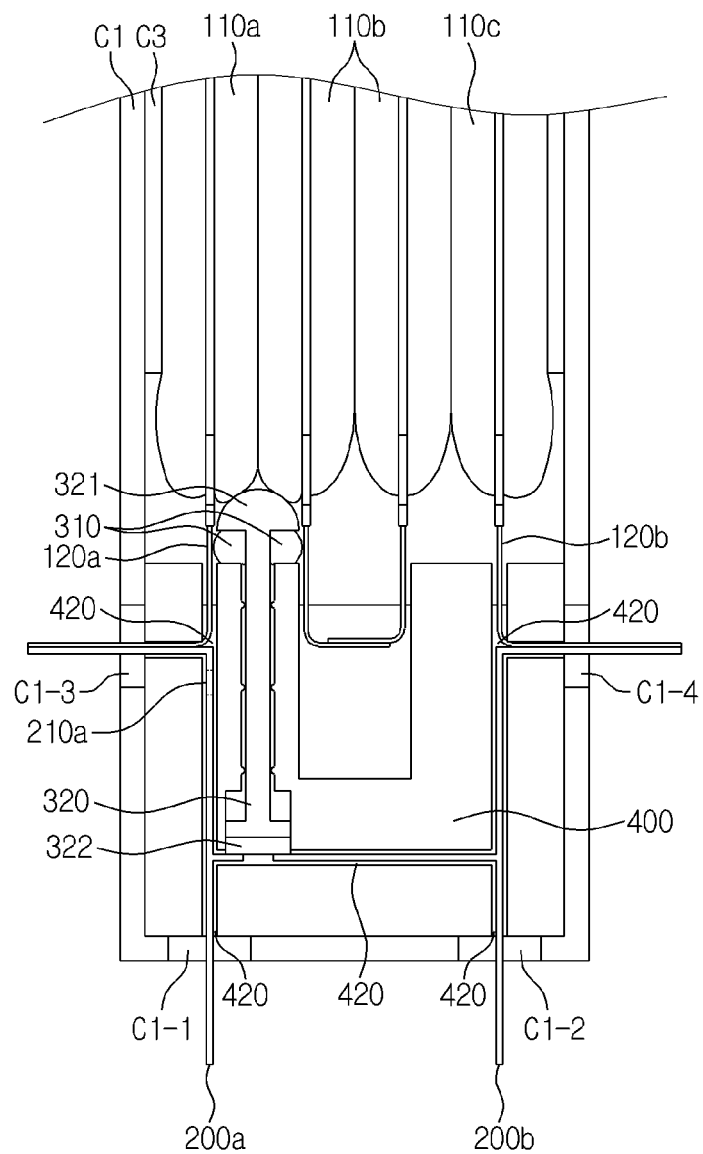
FIG. 7 is a diagram showing the top surface of the battery module according to an embodiment of the present disclosure, after volume increase occurs.

FIG. 7 is a diagram showing the top surface of the battery module according to an embodiment of the present disclosure, after volume increase occurs.

Referring to FIG. 7 further, if the battery module is overcharged, the volume of the first battery cell 110a may increase. At this time, if the volume of the first battery cell 110a increases, the contact portion 321 of the slide bar 320 may receive an expansive force from the first battery cell 110a.

After that, the slide bar 320 may move in a direction toward the first bus bar 200a and the second bus bar 200b due to the expansive force applied to the contact portion 321. Finally, the short-circuit terminal 322 placed on the placing portion of the slide bar 320 may contact the first bus bar 200a and the second bus bar 200b to electrically connect the first bus bar 200a and the second bus bar 200b.

By doing so, the circuit including the short-circuit terminal 322, the first bus bar 200a and the second bus bar 200b may form a short circuit.

For this, the short-circuit terminal 322 may be made of a conductive material.

As described above, in the battery module according to an embodiment of the present disclosure, if the volume of the first battery cell 110a increases due to the overcharge, the short-circuit unit 300 may receive an expansive force from the first battery cell 110a to move toward the first bus bar 200a and the second bus bar 200b and electrically connect the first bus bar 200a and the second bus bar 200b, thereby generating a short circuit.

Hereinafter, the circuit configuration according to the movement of the short-circuit unit of the battery module according to an embodiment of the present disclosure will be described.

Figure 8:
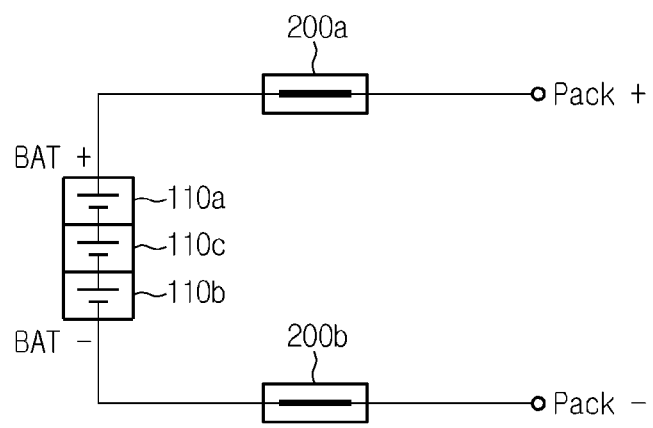
FIG. 8 is an equivalent circuit diagram before overcharge occurs at the battery module according to an embodiment of the present disclosure.
Figure 9:
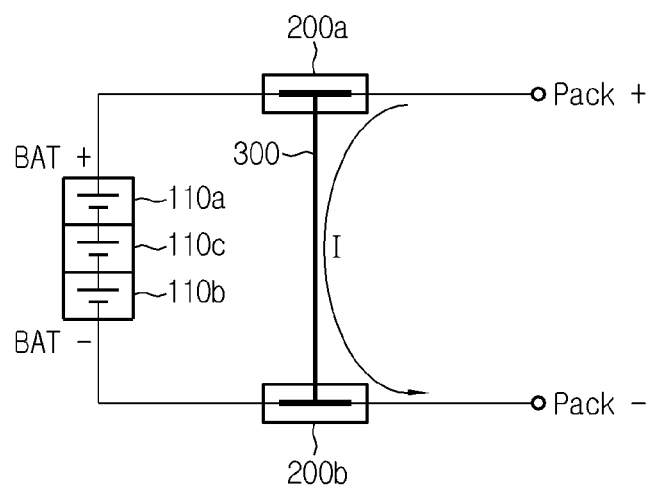
FIG. 9 is an equivalent circuit diagram just after a short-circuit unit moves after overcharge occurs at the battery module according to an embodiment of the present disclosure.
Figure 10:
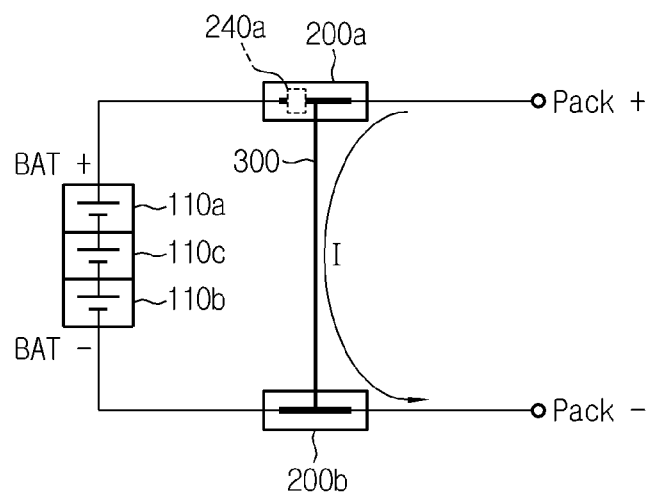
FIG. 10 is an equivalent circuit diagram after the short-circuit unit moves to fracture fracturing portion after overcharge occurs at the battery module according to an embodiment of the present disclosure.

FIG. 8 is an equivalent circuit diagram before overcharge occurs at the battery module according to an embodiment of the present disclosure, FIG. 9 is an equivalent circuit diagram just after a short-circuit unit moves after overcharge occurs at the battery module according to an embodiment of the present disclosure, and FIG. 10 is an equivalent circuit diagram after the short-circuit unit moves to fracture fracturing portion after overcharge occurs at the battery module according to an embodiment of the present disclosure.

Referring to FIGS. 8 to 10, if the battery module according to the present disclosure is not overcharged but operates normally, as shown in FIG. 8, the volume of the plurality of battery cells 110a, 110b, 110c does not increase, and thus the first bus bar 200a and the second bus bar 200b may not cause an electrical short circuit.

However, as shown in FIG. 9, if the battery module according to the present disclosure is overcharged to increase the volume of the first battery cell 110a, the short-circuit unit 300 may receive an expansive force from the first battery cell 110a to move to the first bus bar 200a and the second bus bar 200b. Accordingly, the short-circuit terminal of the short-circuit unit 300 may contact the first bus bar 200a and the second bus bar 200b and electrically connect the first bus bar 200a and the second bus bar 200b to generate a short circuit.

By doing so, a short circuit including the short-circuit unit 300, the first bus bar 200a and the second bus bar 200b is formed so that a high current I may flow.

After that, if the high current I flows continuously at the first bus bar 200a, as shown in FIG. 10, the fracturing portion 240a having great resistance due to a small cross section generates high-temperature resistance heat and thus is fractured, thereby cutting the power supplied from the external power source to the battery module and thus preventing the overcharge.

Figure 11:
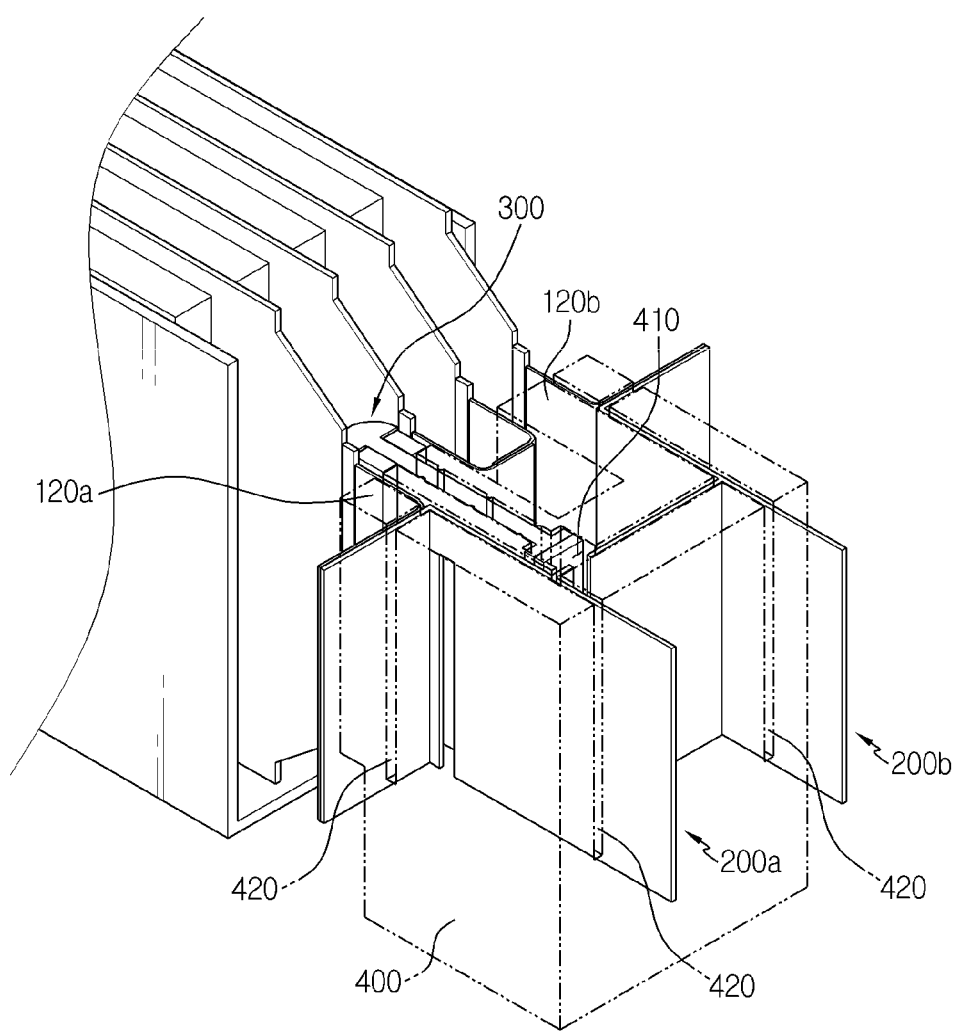
FIG. 11 is a perspective view showing an inside of a cartridge of the battery module according to an embodiment of the present disclosure.

FIG. 11 is a perspective view showing an inside of a cartridge of the battery module according to an embodiment of the present disclosure.

Referring to FIG. 11, the cartridge 400 may accommodate or support a part of the first electrode lead 120a of the first battery cell 110a, the second electrode lead 120b of the second battery cell 110b, the first bus bar 200a, the second bus bar 200b and the short-circuit unit 300.

More specifically, the cartridge 400 may support the first electrode lead 120a of the first battery cell 110a and the first bus bar 200a, which are in surface contact with each other to be electrically connected, at a lower portion thereof, and may support the second electrode lead 120b of the second battery cell 110b and the second bus bar 200b, which are in surface contact with each other to be electrically connected, at a lower portion thereof.

For this, the cartridge 400 may have a support groove 420 formed to have a shape corresponding to the bending shape of the first electrode lead 120a of the first battery cell 110a, the second electrode lead 120b of the second battery cell 110b, the first bus bar 200a and the second bus bar 200b.

Meanwhile, the cartridge 400 may have an accommodation portion 410 formed therein with a shape corresponding to a shape of the short-circuit unit 300 to accommodate the short-circuit unit 300 therein.

At this time, the accommodation portion 410 of the cartridge 400 may be formed to correspond to the movement of the short-circuit unit 300.

In other words, the accommodation portion 410 of the cartridge 400 may be formed to correspond to a location before the short-circuit unit 300 receives the expansive force and a location after the short-circuit unit 300 receives the expansive force.

In addition, the accommodation portion 410 may be formed at the inside of the cartridge 400 to have a shape corresponding to an appearance of the short-circuit unit 300.

The battery module according to the present disclosure may improve the stability of the battery module by fracturing the first bus bar accurately when the battery cell abnormally expands to cut off the power supplied from the external voltage source and thus prevent the overcharge of the battery module.

Meanwhile, a battery pack according to the present disclosure includes at least one battery module as described above. At this time, in addition to the battery module, the battery pack may further include a case for accommodating the battery module, and various devices for controlling charge/discharge of the battery module such as a battery management system (BMS), a current sensor and a fuse. In particular, the battery pack according to an embodiment of the present disclosure may include the first bus bar, the second bus bar, the short-circuit unit and the cartridge at each battery module to cut off the power supplied from the external voltage source by fracturing the first bus bar when the battery cell abnormally expands, so that overcharge is prevented for each battery module.

The battery module according to the present disclosure may be applied to a vehicle such as an electric vehicle and a hybrid vehicle. That is, the vehicle according to the present disclosure may include the battery module of the present disclosure.

The present disclosure can be substituted, modified or changed in various ways without departing from the scope of the present disclosure by those skilled in the art and thus is not limited to the above embodiments and the accompanying drawings.

What is claimed is:

1. A battery module, comprising:
a first bus bar electrically connected to a first electrode lead of a first battery cell;
a second bus bar electrically connected to a second electrode lead of a second battery cell;
a short-circuit unit configured to move toward the first bus bar and the second bus bar by receiving an expansive force due to a volume increase of the first battery cell and an other battery cell adjacent to the first battery cell so that the first bus bar and the second bus bar are electrically connected to generate a short circuit; and
a cartridge configured to accommodate or support at least a portion of the first electrode lead, the second electrode lead, the first bus bar, the second bus bar and the short-circuit unit,
wherein the short-circuit unit includes:
a slide bar having a contact portion provided at a first end thereof and in contact with one end of the first battery cell to receive the expansive force, and a placing portion provided at a second end thereof so that a short-circuit terminal is placed thereon; and
a buffering member having a first end and a second end that are respectively in contact with the contact portion and the cartridge, so as to be compressed by the slide bar to absorb an impact when the slide bar moves toward the first bus bar and the second bus bar.

2. The battery module according to claim 1, wherein when the volume of the first battery cell and the other battery cell adjacent to the first battery cell increases, the slide bar receives the expansive force through the contact portion to move toward the first bus bar and the second bus bar.

3. The battery module according to claim 1, wherein the short-circuit terminal is in contact with the first bus bar and the second bus bar and electrically connects the first bus bar and the second bus bar to generate a short circuit.

4. The battery module according to claim 1, wherein the short-circuit terminal is made of a conductive material.

5. The battery module according to claim 1, wherein the first bus bar includes:

a first connection plate contacted and electrically connected to the first electrode lead;
a first power plate formed to extend from the first connection plate in a direction away from the first battery cell and be electrically connected to an external power source; and
a first protruding plate formed to protrude toward the second bus bar from the first power plate.

6. The battery module according to claim 5, wherein the second bus bar includes:
a second connection plate contacted and electrically connected to the second electrode lead;
a second power plate formed to extend from the second connection plate in a direction away from the second battery cell and be electrically connected to the external power source; and
a second protruding plate formed to protrude toward the first bus bar from the second power plate.

7. The battery module according to claim 6, wherein at least one of the first bus bar and the second bus bar further includes a fracturing portion that is fractured to cut an electric connection to the outside when the short circuit is generated.

8. The battery module according to claim 7, wherein the fracturing portion is formed to have a cross section smaller than an average cross section of the first bus bar or the second bus bar.

9. The battery module according to claim 7, wherein the fracturing portion is formed in at least one of the first power plate of the first bus bar and the second power plate of the first bus bar.

10. The battery module according to claim 1, wherein the cartridge has an accommodation portion formed therein with a shape corresponding to a shape of the short-circuit unit to accommodate the short-circuit unit therein.

11. The battery module according to claim 1, wherein the cartridge supports at least a portion of each of the first electrode lead and the first bus bar that are in surface contact with each other to be electrically connected, and supports at least a portion of each of the second electrode lead and the second bus bar that are in surface contact with each other to be electrically connected.

12. A battery pack comprising:
a case;
a battery management system; and
a battery module according to claim 1 in the case.

13. A vehicle comprising:
a vehicle motor; and
a battery module according to claim 1 connected to the vehicle motor.

* * * * *